United States Patent [19]

Cesar et al.

[11] 4,302,265
[45] Nov. 24, 1981

[54] PROCESS OF MANUFACTURING TIRES FOR VEHICLE WHEELS

[75] Inventors: Jean-Pierre Cesar, Sayat; André Schneider, St. Hyppolyte, both of France

[73] Assignee: Compagnie Generale des Etablissements Michelin, Clermont-Ferrand, France

[21] Appl. No.: 175,899

[22] Filed: Aug. 6, 1980

[30] Foreign Application Priority Data

Aug. 13, 1979 [FR] France .............................. 79 20755

[51] Int. Cl.³ .................... B29H 17/14; B60C 9/18
[52] U.S. Cl. ........................ 156/117; 156/123 R; 156/128 N; 152/361 R; 152/361 FP; 152/357 R
[58] Field of Search ............ 156/110 R, 110 CL, 117, 156/123 R, 124, 126, 127, 128 R, 128 N, 129, 130, 133; 152/361 R, 361 FP, 361 DM, 357-359

[56] References Cited

U.S. PATENT DOCUMENTS

| | | | |
|---|---|---|---|
| 2,317,911 | 4/1943 | Hoff | 152/357 R |
| 2,757,701 | 8/1956 | Henson | 152/357 R |
| 3,373,066 | 3/1968 | Hindin | 152/361 |
| 3,674,079 | 7/1972 | Varner | 152/361 |
| 4,231,410 | 11/1980 | Vannan | 152/356 R |

*Primary Examiner*—John E. Kittle
*Attorney, Agent, or Firm*—Brumbaugh, Graves, Donohue & Raymond

[57] ABSTRACT

In a process of manufacturing a tire for vehicle wheels, an annular crown reinforcement is placed around the carcass of the tire. As the crown reinforcement there is used at least one elastically deformable annular net formed of two superimposed plies of wires at least the outside of which wires is formed of an elastic and weldable material. At the points of intersection these wires are welded to each other. The wires may also be in the form of a cable, metallic or otherwise, enclosed in a sheath of an elastic and weldable material.

8 Claims, 7 Drawing Figures

PROCESS OF MANUFACTURING TIRES FOR VEHICLE WHEELS

The present invention concerns a process of manufacturing tires having a crown reinforcement formed of at least two plies of wires or cables which are parallel in each ply and crossed from one ply to the next forming acute angles with the circumferential direction of the tire.

It is already known to produce separately a crown reinforcement in the form of a ring and then to place this ring around a carcass expandable into toroidal shape, the carcass having two sidewalls joined to each other by an equatorial connecting element or portion, each sidewall being terminated by a bead, the carcass being possibly provided with a radial or bias reinforcement or else a partially radial and partially bias reinforcement. At the time of placing the crown reinforcement on the carcass, the carcass may be either in the state of an expandable cylindrical blank, in which case the assembly (carcass+crown reinforcement) is then shaped into toroidal shape, or in expanded toroidal shape, in which case the crown reinforcement is placed on the equatorial connecting element or portion of the carcass.

The building of an annular crown reinforcement by the superimposing of several plies of wires or cables presents a number of drawbacks.

First of all, it is necessary to provide a large number of building drums of different diameters depending on the dimensions of the tires. The placing of the plies around the drum is time consuming. The same is true of the joining of the ends of each ply, the connections of the different plies having furthermore to be staggered circumferentially with respect to each other. It is difficult to form rings all of which have precisely the same circumferential development for the same size carcass reinforcement. The latter therefore assumes a different equilibrium figure from one tire to the next. The storing of the rings while awaiting mounting on the carcass reinforcement requires a good deal of space and may result in deformations of the rings.

The object of the present invention is, on the one hand, to avoid the building ply by ply of the annular crown reinforcements and the drawbacks thereof and, on the other hand, to build annular reinforcements having the diameter of the crown reinforcement of the finished tire.

Therefore, the process of the invention is characterized by the fact that as the crown reinforcement there is used at least one annular net which is continuous in the circumferential direction of the tire and elastically deformable so that in deformed state its developed length is equal to the developed length of the equatorial connecting element or portion of the carcass, this net being formed of two superimposed plies of continuous segments of wires of the same length parallel in each ply and crossed from one ply to the other at an angle at most equal to 90° with respect to the circumferential direction of the tire, at least the outside of the wires being formed of an elastic and weldable material permitting welding of the wires of one ply to those of the other ply at the points where they intersect.

The basic principle of the invention resides in the use of nets which are elastically deformable due to the fact that their wires are produced, for instance by extrusion, at least with respect to the outside of the wires, from an elastic and weldable material, such as mixes having a base of elastomers which are vulcanizable by customary means and/or having a base of thermoplastic elastomers or thermoplastic polymers.

By convention there is designated as weldable material a material which has the property of making it possible to weld (e.g., by conventional heat softening and cooling treatment) the wires of one ply to those of the other ply at the points where they intersect without the material which forms the points of weld of one ply to the next losing its elasticity. For this reason, when such a net is expanded elastically in order to place it, in accordance with the invention, over the equatorial connecting element or portion of the carcass, its circumferential development increases while the angle formed by the wires of only ply relative to those of the other ply decreases as does the axial width of the net. This is the case where, after having placed such a net around a carcass which is in the form of a cylindrical blank, the assembly (carcass+net) is shaped into a toroidal shape. The net readily stays in place on the carcass due to its elastic tendency to return to its initial circumferentially nondeformed shape.

Therefore, the first variant is characterized by the fact that the carcass is in cylindrical state and by the fact that the annular net has in nondeformed state a developed length at most equal to the developed length of the cylindrical carcass, the assembly (carcass+net) being then expanded to the toroidal shape of the tire.

The second variant is characterized by the fact that the carcass is in the toroidal shape of the tire and by the fact that the annular net has in non-deformed state a developed length less than and in deformed state a developed length at most equal to the development of the equatorial connecting element or portion of the carcass.

The carcass may have been produced from one or more paste materials which solidify in a mold forming the elastomeric mass of the tire or by superimposing elastomeric components in unvulcanized state, and may or may not have a reinforcement of customary radial or bias type or else partially radial and partially bias.

In order to produce in accordance with the invention a crown reinforcement having two crossed plies of identical axial width, the wires of the two plies of the annular net are in the form of cables sheathed with an elastic and weldable material.

The process of the invention for producing a crown reinforcement, the two plies of which have different axial widths, consists in using two annular nets arranged one radially to the outside of the other, the first net being placed on the equatorial connecting element or portion of the carcass and being formed of a ply of wires formed entirely of an elastic and weldable material and of another ply of cables sheathed with an elastic and weldable material, the second net having an axial width less than that of the first net and being formed of a ply of cables sheathed with an elastic and weldable material and crossed with respect to those of the first net and of another ply of wires formed entirely of an elastic and weldable material, the elastic and weldable material being preferably the same for all four plies, the plies of cables sheathed with elastic and weldable material of the first and second nets being preferably arranged next to each other.

In order to produce in accordance with the invention a crown reinforcement with folded edges, there is used a net, one ply of which is formed of wires formed entirely of an elastic and weldable material, and the other ply of which is formed of cables sheathed with an elastic and weldable material, preferably a material identical to that of the above ply, and the edges of the net are folded on so that they are contiguous or not or overlap.

The process of the invention for constructing a crown reinforcement formed of a folded ply and of a nonfolded ply is characterized by the fact that the edges of the first axially wider net are folded around the edges of the second net so that the edges of the first axially wider net are contiguous or not or overlap, each net having one ply of cables sheathed with an elastic and weldable material which is preferably the same for all four plies, the two plies of sheathed cables being preferably arranged next to each other.

The construction and production of the assemblies (carcass+net or crown reinforcement) in accordance with the invention are completed by the customary means.

Preferably, the elastic and weldable material of the double-ply nets is identical for each ply and identical to or at least compatible with the components of the tires which are in contact with the nets.

The expression "cable" (possibly reinforcing one or both plies of nets) refers in general to any continuous filiform element capable of reinforcing tire reinforcement plies, particularly textile or glass fiber cables, or metal cables, for instance steel wires or fibers.

The drawing and the portion of the description referring thereto illustrate various embodiments of the invention. In the drawing FIG. 1 shows an elastic net in its initial state after its production and before circumferential expansion;

Figure 1:
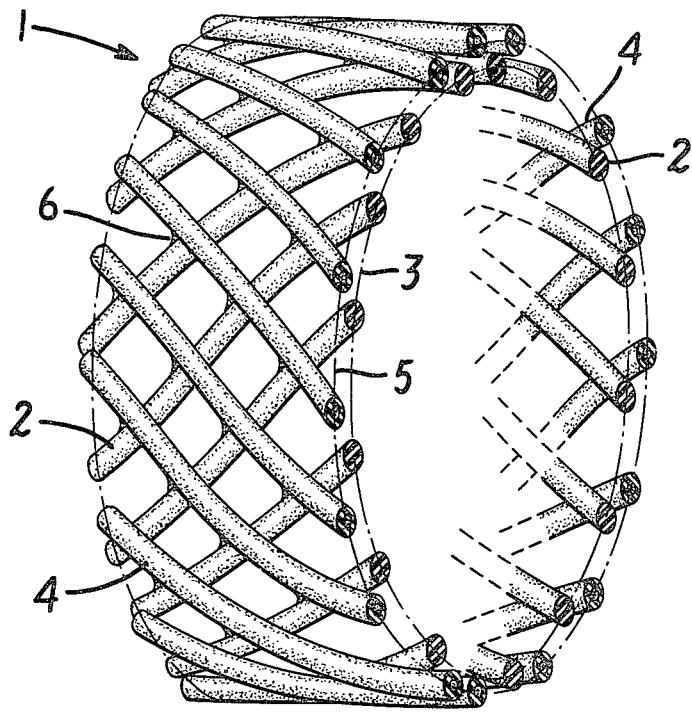
Figure 2:
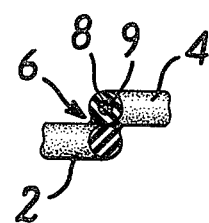
FIG. 2 is a sectional view of a point of intersection of the wires of the two plies constituting the net.

In the drawing, the space between the wires and their diameter in FIGS. 1 and 2 have been exaggerated for greater clarity of the showing.

FIG. 1 shows a net 1 of suitable width shown in its initial (nondeformed) cylindrical state. The wires 2 of the ply 3 are welded to the wires 4 of the ply 5, thus forming the elastic nodes 6 which permit the elastic deformation of the net 1. The welding of the two wires 2 and 4 to each other is shown in FIG. 2. This weld forms an elastic node 6 which permits the elastic deformation of the entire net 1. At least some of the wires 2 and/or 4 of the plies 3 and/or 5 can be each in the form of a cable 8 (as defined above) enclosed in a sheathing of elastic and weldable material 9, the other wires of these plies being formed entirely of such a material.

Figure 3:
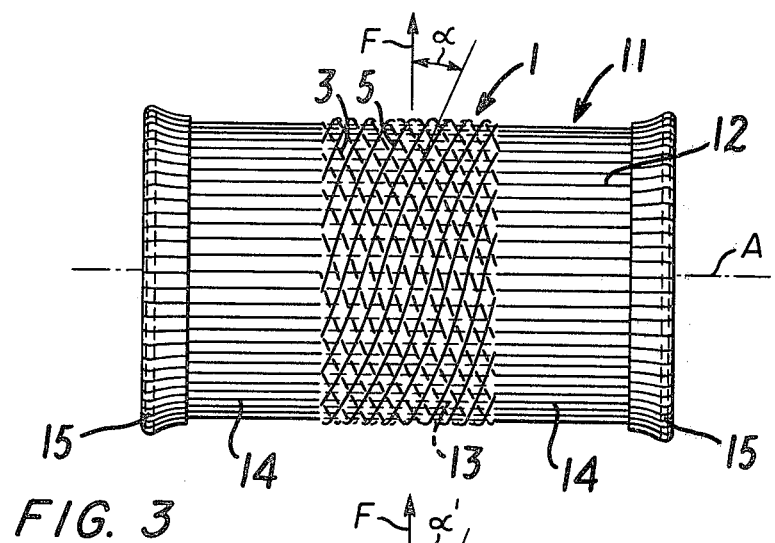
FIG. 3 shows an elastic net surrounding a carcass in the form of a cylindrical blank and forming a double-ply crown reinforcement.

FIG. 3 shows a net 1 placed around the equatorial connecting element or portion 13 of a cylindrical tire carcass 11 comprising cables 12 arranged parallel to the axis of revolution A of the carcass 11. The equatorial connecting element or portion 13 joins the two sidewalls 14 of the carcass 11 to each other, each of which sidewalls is terminated by a bead 15. This net 1 is similar to the one described with reference to FIGS. 1 and 2. All the wires of the plies 3 and 5 of this net 1 are in the form of a sheathed cable, like the wire 4 of FIG. 2. On this cylindrical carcass 11, the wires of the plies 3 and 5 form the angle $\alpha$ with the circumferential direction indicated by the arrow F.

Figure 4:
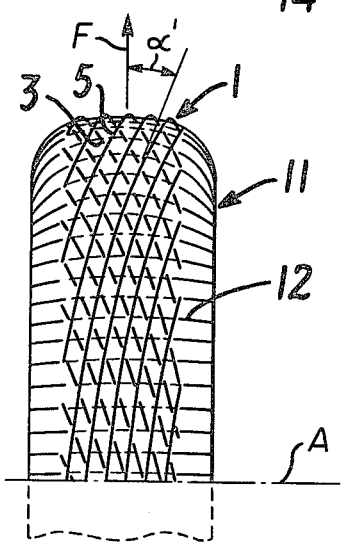
FIG. 4 shows one-half of the assembly of FIG. 3 shaped in toroidal state or an elastic net surrounding a carcass which is already in toroidal state before the finishing of the tire.

When the cylindrical carcass 11 surrounded by the net 1 has been shaped in the customary manner into the toroidal shape close to that of the finished tire, it can be seen from FIG. 4, by way of comparison with FIG. 3, that the net 1 has narrowed, that its diameter has increased at the same time as the diameter of the carcass 11 increased and that the angles $\alpha'$ which the wires of the two plies 3 and 5 form with the circumferential direction indicated by the arrow F have become smaller than the angles $\alpha$ measured on the cylindrical carcass 11.

Figure 5:
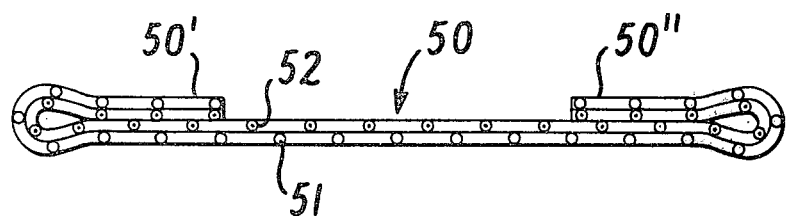
FIG. 5 shows, in meridian cross-section, a net folded on itself to form a crown reinforcement with folded edges.

The crown reinforcement shown in FIG. 5 is formed by a net 50 composed of a ply of wires 51 formed entirely of an elastic and weldable material, and of a ply of cables 52 each enclosed in a sheath of an elastic and weldable material. The edges 50',50'' of the net 50 are folded in the manner that the ply of cables 52 is folded over on itself.

Figure 6:
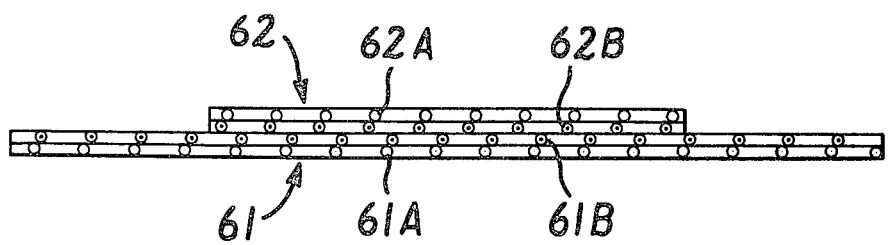
FIG. 6 show, in meridian cross-section, two nets superimposed to form another crown reinforcement.

FIG. 6 shows a crown reinforcement composed of two superimposed nets 61 and 62 of different width. Each of these nets is composed of a ply of wires 61A, 62A, which are formed entirely of an elastic and weldable material, welded to a ply of cables 61B and 62B, respectively, each enclosed in a sheath of an elastic and weldable material. These two nets 61 and 62 are arranged one upon the other in such a manner that the plies of cables 61B and 62B are next to each other.

Figure 7:
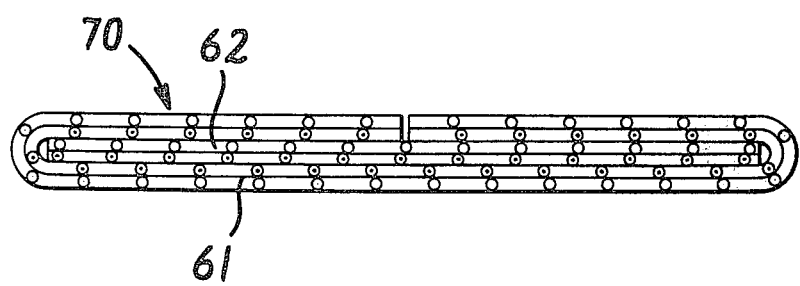
FIG. 7 shows, in meridian cross-section, two nets superimposed to form another crown reinforcement with folded edges.

The crown reinforcement 70 shown in FIG. 7 differs from the preceding one merely by the fact that the edges of the wider net 61 have been folded over onto the narrower net 62 and meet each other.

It is evident that with one or more nets in accordance with the invention one can form crown reinforcements having edges which are folded or not, in the same manner as with plies of conventional individual cables, so that the embodiments described above are not to be considered to limit the invention, as defined in the accompanying claims, to these examples alone.

Among the elastic and weldable materials which can be used for the present invention mention may be made of thermoplastic polyolefins (such as high-density polyethylene, polypropylene, polymethylpentenes and copolymers of these products), acrylonitrile-butadiene-styrene (ABS), the thermoplastic elastomers (thermoplastic polyurethanes, polyetheresters), the polyamides, the polyesters and unvulcanized rubber mixes.

The cables which can be used for the invention may be metallic, or of natural, artificial or synthetic textile, or of glass fiber.

What is claimed is:

1. A process of manufacturing a tire using a carcass expandable into toroidal shape with two sidewalls joined to each other by an equatorial connecting element or portion, each sidewall being terminated by a bead, and a crown reinforcement placed around said carcass and formed of at least two plies of reinforcing elements which are parallel in each ply and crossed from one ply to the next forming acute angles with the circumferential direction of the tire, characterized by the fact that as the crown reinforcement there is used at least one annular net which is continuous in the circumferential direction of the tire and elastically deformable so that in deformed state its developed length is equal to the developed length of the equatorial connecting element or portion of the carcass, this net being formed of two superimposed plies of continuous segments of wires of the same length parallel in each ply and crossed from one ply to the other at an angle at most equal to 90° with respect to the circumferential direction of the tire, at least the outside of the wires being formed of an elastic and weldable material permitting welding of the wires of one ply to those of the other ply at the points where they intersect.

2. The process according to claim 1, characterized by the fact that the carcass is in cylindrical state and by the fact that the annular net has in nondeformed state a developed length at most equal to the developed length of the carcass, the assembly (carcass+net) being then expanded to the toroidal shape of the tire.

3. The process according to claim 1, characterized by the fact that the carcass is in the toroidal shape of the tire and by the fact that the annular net has in nondeformed state a developed length less than and in deformed state a developed length at least equal to the developement of the equatorial connecting element or portion of the carcass.

4. The process according to claim 1, characterized by the fact that the carcass has a radial or bias or partially radial and partially bias reinforcement.

5. The process according to claim 1, characterized by the fact that the wires of the two plies of the annular net are in the form of cables sheathed with an elastic and weldable material.

6. The process according to claim 1, characterized by the fact that there are used two annular nets arranged one radially outside of the other, the first net being placed on the equatorial connecting element or portion of the carcass and being formed of a ply of wires formed entirely of an elastic and weldable material and of another ply of cables sheathed with an elastic and weldable material, the second net having an axial width less than that of the first net and being formed of a ply of cables sheathed with an elastic and weldable material and crossed with respect to those of the first net and of another ply of wires formed entirely of an elastic and weldable material, the elastic and weldable material being preferably the same for all four plies, the plies of cables sheathed with elastic and weldable material of the first and of the second nets being preferably arranged next to each other.

7. The process according to claim 1, characterized by the fact that there is used a net one ply of which is formed of wires formed entirely of an elastic and weldable material and the other ply of which is formed of cables sheathed with an elastic and weldable material, preferably a material identical to that of the above ply, and by the fact that the edges of the net are folded on themselves so that they are contiguous or not or overlap.

8. The process according to claim 6, characterized by the fact that the edges of the first axially wider net are folded around the edges of the second net so that the edges of the first axially wider net are contiguous or not or overlap.

* * * * *